3,275,578
FLAME RESISTANT URETHANE POLYMER COMPOSITIONS OF IMPROVED DIMENSIONAL STABILITY CONTAINING A PENTAHALOPHENYL ESTER AND AN ANTIMONY COMPOUND
Joseph J. Pedjac, Mount Pleasant, and Charles T. Pumpelly, Midland, Mich., assignors to The Dow Chemical Company, Midland, Mich., a corporation of Delaware
No Drawing. Filed Dec. 12, 1963, Ser. No. 329,942
6 Claims. (Cl. 260—2.5)

This invention relates to urethane polymer compositions. More particularly, it relates to self-extinguishing polyurethane compositions and cellular structures made from such compositions. This invention also pertains to compositions suitable for rendering materials self-extinguishing.

Polyurethanes are organic polymers containing repeated urethane linkages. These polymers can be made by reacting an organic polyisocyanate with an organic compound having a plurality of active hydrogens. By a compound having active hydrogen is meant a compound that gives a positive Zerewitinoff test. Polyurethane resins can be made into foams having excellent strength, durability, low density, light color, uniform cell size and good heat insulating properties, and can be used for many purposes. Unfortunately, these foams burn readily when ignited; that is, they support combustion thus making them unsuitable for certain uses in which fire is a hazard. Accordingly, it is desirable to make polyurethane resin foams which are self-extinguishing so as to eliminate or minimize the hazard of fire. By "self-extinguishing" it is meant that the material is incapable of burning or sustaining a flame for more than a short time after it is separated from an open flame in which it has been heated and ignited. In other words, a composition is considered to be self-extinguishing if it stops burning shortly afer a flame used to start its burning has been removed or the material is taken out of the flame.

Many halogen-containing compounds, both inorganic and organic, have a tendency to render foams with which they are admixed self-extinguishing by reducing the time that such foams continue to burn after having been separated from a flame causing their ignition. Unfortunately, these halogen-containing compounds often have an effect of impairing to some extent one or more of the desirable physical properties of the foams, notably dimensional stability at moderately elevated temperatures, when incorporated therewith in amounts that are required to render the foam non-flammable or self-extinguishing. Cellular bodies affected in this manner are poorly suited for commercial application.

It is among the objects of the present invention to provide urethane polymer compositions having improved self-extinguishing properties.

A further object of the present invention is to provide self-extinguishing polyurethane resin foam compositions without sacrifice of important physical characteristics of the foamed product.

A still further object of this invention is the provision of self-extinguishing polyurethane foams of good dimensional stability.

These and other objects are accomplished in accordance with the following detailed description of this invention.

In accordance with the present invention, it has been found that the above objects are accomplished and self-extinguishing urethane polymers are provided without sacrifice of dimensional stability when pentahalophenyl esters and certain antimony compounds are present in an intimate mixture in the urethane polymer material.

The pentahalophenyl esters which can be employed according to the present invention are compounds of the formula $$R\overset{O}{\underset{\|}{C}}-O-C_6X_5$$

wherein $$R\overset{O}{\underset{\|}{C}}-O-$$

is a carboxylic acid radical, preferably the radical of an alkanoic acid having from one to four carbon atoms, and X is chlorine or bromine. Representative acids which may be used to form the carboxylic acid portion of the pentahalophenyl esters include formic, acetic, propionic, butyric, and isobutyric.

The pentahalophenyl esters can be prepared by reaction of a pentahalophenol with an appropriate anhydride, acid halide, or carboxylic acid as described in U.S. 2,430,017.

The antimony compounds that coact with the pentahalophenyl esters include antimony oxide, antimonous chloride, antimonous bromide, antimonous iodide, antimonous oxychloride, and antimonous sulfide.

As indicated above, polyurethane resins can be made by reacting an organic polyisocyanate with an organic compound having a plurality of active hydrogens. Representative examples of organic polyisocyanates that can be used to make the resin are 2,4-tolylene diisocyanate, 2,6-tolylene diisocyanate, the phenylene diisocyanates, the naphthalene diisocyanates, 1,2,4-benzene triisocyanate, hexamethylene diisocyanate, trimethylene diisocyanate, ethylene diisocyanate, 1,4-cyclohexylene diisocyanate, 1,3-cyclopentylene diisocyanate and mixtures thereof. Arylene diisocyanates, that is, those in which each of the two isocyanate groups is attached directly to an aromatic ring, are preferred. The compound mentioned above having a plurality of active hydrogens can be a polyhydroxy compound such as glycols, triols, hexols, octols, polyesterpolyols, and polyetherpolyols. A polyesterpolyol can be made by reacting a polybasic acid with an excess of a polyhydric alcohol. If a linear polyesterpolyol is desired, difunctional reactants can conveniently be used, such as phthalic acid or its anhydride, with ethylene glycol. A polyetherpolyol can be made by condensing a polyhydroxy compound such as ethylene glycol, glycerol, and sucrose with an alkylene oxide such as ethylene oxide, propylene oxide, and 1,2-butylene oxide. Using a mixture of polypropylene oxide-glycerol adducts of the formula

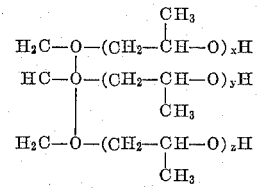

produces a rigid polymer when the sum of $x$, $y$, and $z$ is about 6; and a flexible polymer when the sum of $x$, $y$ and $z$ is about 15 or higher. Relatively low molecular weight alkylene oxide-sucrose condensates produce rigid polymers when polymerized with polyisocyanates. Polymers of varying rigidity and flexibility can be tailored by selecting a condensate or a mixture of condensates of suitable molecular weight and structure to be reacted with the polyisocyanate. Other hydroxyl-rich compounds such as a condensate of ethylenediamine with propylene oxide can be used to produce useful polyurethanes. By still another approach, polyurethanes can be made by reacting a bischloroformate with a polyamine. In all instances, the resulting polymers contain multiple urethane linkages.

Polyurethane resins can be made in cellular form by adding water or a carboxyl group-containing compound to a reaction mixture containing polyisocyanates, whereby carbon dioxide is liberated which causes the liquid reaction mixture to expand and foam. Alternatively, a polyurethane foam may be made by admixing a volatile liquid with one of the reactants, namely, the polyisocyanate or the compound containing a plurality of active hydrogens, before they are mixed. The volatile liquid and the reactants can all be brought together simultaneously or the volatile liquid can be mixed with the reactants shortly after they are brought together. The volatile liquid is converted to a gas when the reactants are combined due to the heat of the reaction or by external heating thereby producing small gas bubbles in the reacting liquid. Representative examples of suitable volatile liquids which can be used for this purpose are trichloromonofluoromethane, hexane, methylchloroform, symmetrical tetrachlorodifluoroethane, and trichlorotrifluoroethane.

A catalyst for the reaction between the isocyanate radical and active hydrogen can be used when making urethane polymers and is usually desirable when a product of cellular form is to be made. Representative examples of suitable catalysts are triethylenediamine, dibutyltin dilaurate, triethylamine, N,N-dimethylcyclohexylamine, cobalt naphthenate, and stannous octoate.

If desired, a cell-size control agent can be added to the reaction mixture. Materials such as the siloxane-oxyalkylene copolymers disclosed in U.S. 2,834,748 are examples of useful cell-size control agents that may be used in the practice of this invention.

The pentahalophenyl esters are employed in amounts sufficient to provide from about 1.5 to about 10 percent halogen in the resultant foam product, preferably from 3 to 5 percent, together with the antimony compounds in amounts of from about 2 to about 5 percent, preferably from 3 to 4 percent, based on the weight of the urethane reaction mass.

Self-extinguishing urethane polymer compositions are obtained by employing both the pentahalophenyl esters and the antimony compounds in proportions within these ranges.

The pentahalophenyl esters and the antimony compounds can be incorporated in the resin by any method which gives uniform distribution of the agents throughout the body of the resin and which does not cause or result in appreciable deterioration or decomposition of either of said agents or the resin.

The pentahalophenyl esters and the antimony compounds can be premixed and then added to the isocyanate material or to the active hydrogen-containing material before the said materials are brought together to form the polymer. Alternatively, the flame retardant agents of this invention can be premixed and then blended with the polymer-forming reactants as they are brought together or shortly after they are combined and before the reaction has proceeded to a point where uniform dispersion of the synergists with the polymer is no longer practicable. If desired, the flame retardant agents of this invention may be added one at a time to the polymer-forming constituents. To illustrate, one of the agents can be added to the isocyanate material, to the active hydrogen-containing material, to a mixture of these materials as they are brought together or shortly thereafter and before the reaction of the polymer-forming constituents has proceeded to a point where uniform dispersion of the additive in the polymer is no longer practicable, or at two or more of these places. The other agent can be added at one or more of the above places which may be the same as or different from where the first agent is added.

The formulations of this invention can be made by batch methods employing either hand mixing or simple stirring equipment. Several types of mechanical equipment are available which can automatically meter the constituents to a mixer and dispense foams in predetermined quantities. This equipment can be run either continuously or intermittently.

Self-extinguishing polymer compositions of this invention can be made into useful articles by conventional molding, casting, coating, and laminating techniques. Foams of these compositions can be cast onto a conveyor belt to produce sheets or slabs of self-extinguishing polyurethane foams which may then be cut up into convenient sizes. The self-extinguishing foams made from the compositions of this invention can be cast in molds to make desired shapes or the foams can be cast in place to fill voids in a final article as in the potting of electrical equipment and the strengthening of double-walled members.

The following examples are illustrative of the present invention, but the invention is not limited thereto.

EXAMPLE I

A polyurethane foam was prepared from the following formulation:

Reactant: Grams

Voranate R–1, an isocyanate adduct of a polyetherpolyol prepared by condensing propylene oxide on glycerol to an average molecular weight of 325 and reacting the resulting polyetherpolyol with an excess of toluene diisocyanate having the following properties _____ 53.7

| Percent Excess NCO | Approx. Visc. CRS at 100° F. |
|---|---|
| 27 | 1,600 |

Voranol 600, a polyetherpolyol prepared by reacting (2.5 moles glycerine+1.0 mole sucrose+0.5 mole water with 1 mole propylene oxide per OH, having the following properties _____ 32.7

| MW/OH | OH No. | Viscosity CRS at 100° F. |
|---|---|---|
| 95 | 600 | 4,500 |

Silicone X–520, a siloxane-oxyalkylene block copolymer mixture according to U.S. Patent No. 2,834,748 _____ 0.254
Stannous octoate _____ 0.432
Pentabromophenyl acetate _____ 10.0
$Sb_2O_3$ _____ 4.0

The reactants were thoroughly mixed for about 20 seconds to assure uniform distribution of all constituents and then poured into a rectangular mold. When the foam had gelled, it was placed in an oven at 70° C. After 30 minutes the foam was removed from the oven and allowed to cool to room temperature. The cellular mass was a white, rigid, fine-celled foam.

A test strip was cut from the foamed product and tested for flammability. The strip was in the shape of a rectangular prism three inches long, ¾ inch wide, and ½ inch thick. The strip was placed in the flame of a microburner and after approximately four seconds, it was removed. Upon removal from the microburner flame, the strip itself was aflame and continued to burn for 1 second from the time it was removed from the microburner flame. After the 1 second had elapsed, the flame on the foamed polymer strip went out; that is, the material no longer sustained a flame and was recorded as having a self-extinguishing time of 1 second.

For comparative purposes, a number of other halogenated compounds which do not fall within the scope of this invention were substituted for pentabromophenyl acetate in the foam formulations. The physical and self-extinguishing properties of these halogenated compounds (Samples B through G) as well as those of the present invention (Sample A) are listed in Table I below.

TABLE I

| Sample | Halogen-containing compound added to foam formulation | Percent by wt. of formulation | Percent Sb₂O₃ in foam | Percent Halogen in foam | Self-extinguishing time (seconds) |
|---|---|---|---|---|---|
| A | Pentobromphenyl acetate | 4.95 | 3.67 | 3.45 Br | 1-1.5 |
| B | 2,4,6-tribromophenyl acetate | 8.76 | 3.51 | 4.86 Br | 1-1.5 |
| C | Pentabromophenol | 8.76 | 3.51 | 7.17 Br | 1 |
| D | Hexachlorocyclohexane | 8.76 | 3.51 | 6.41 Cl | 1.5-2 |
| E | ar-Pentabromoethyl benzene | 8.50 | 3.55 | 6.04 Br | 1-1.25 |
| F | Hexabromobenzene | 8.77 | 3.51 | 7.64 Br | 1 |
| G | Glycerol trisbromo acetate | 8.0 | 3.57 | 3.77 Br | 1-1.5 |

The foams listed in Table I were next tested for dimensional stability. In this test, test blocks approximately 1¾" x 1¾" x 3" in size were cut from the foam. The volume of the foam block was accurately measured by the volume of water it displaced. The sample was then placed in a humidity chamber maintained at 70° C. and 100% relative humidity. Volume changes were observed over a period of several weeks and are recorded in Table II below. In this table, a plus (+) sign in front of a number designates an increase in the original volume of the foam, while a minus (−) sign indicates a decrease in the original volume of the foam.

TABLE II
[Percent Volume Change]

| Sample | Number of Days on Test | | | | | | | | | | | | | | |
|---|---|---|---|---|---|---|---|---|---|---|---|---|---|---|---|
| | 1 | 2 | 4 | 5 | 6 | 7 | 11 | 13 | 16 | 17 | 20 | 21 | 24 | 25 | 27 | 28 |
| A | +0.57 | | | +3.4 | | | | +3.98 | | | +5.1 | +3.98 | | | 0 | |
| B | +5.88 | | | +8.19 | | | | +15.35 | | | +13.6 | +14.0 | | | +17.2 | |
| C | | | +19.0 | | | +15.8 | +9.5 | +13.7 | | +4.2 | | +2.1 | | +1.05 | | |
| D | | +7.88 | | | | +8.6 | | | | +7.88 | | +7.1 | | +7.1 | | |
| E | +5.9 | | | | +8.4 | | | | | | | | | | | +10.1 |
| F | +7.9 | | | | +9.2 | | | | | | | | | | | +14.6 |
| G | +13.5 | | | | +18.2 | | | | | | | | | | | |

The data in Table II show that addition of flame-retardant compositions of the present invention (Sample A) does not adversely affect the dimensional stability of the foamed product, the maximum volume change being +5.1%; whereas the volume changes of halogenated compositions which do fall within the scope of the present invention (Samples B through G) are substantially higher and generally render the foams unsuitable for commercial application.

In place of the pentabromophenyl acetate compound used in the foregoing Example I, Sample A, there can be used other of the pentahalophenyl esters hereinbefore described as, for example, pentachlorophenyl acetate, pentabromophenyl formate, pentachlorophenyl formate, pentabromophenyl propionate, pentachlorophenyl propionate, pentabromophenyl butyrate, pentachlorophenyl butyrate, pentabromophenyl isobutyrate, and pentachlorophenyl isobutyrate with substantially the same results.

What is claimed is:

1. A composition of matter comprising a polyurethane resin containing admixed therewith a pentahalophenyl ester having the formula

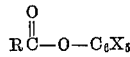

wherein

is the radical of an alkanoic acid having from one to four carbon atoms and X is chlorine or bromine and from about 2 to about 5 percent, based on the weight of the resin, of an antimony compound selected from the group consisting of the oxide, chloride, bromide, iodide, oxychloride and sulfide.

2. A composition according to claim 1 in which the pentahalophenyl ester is pentabromophenyl acetate.

3. A composition according to claim 1 in which the antimony compound is Sb₂O₃.

4. A self-extinguishing foam having improved dimensional stability comprising a normally flammable polyurethane resin in intimate admixture with from about 2 to about 5 percent, based on the weight of the foam, of an antimony compound selected from the group consisting of the oxide, chloride, bromide, iodide, oxychloride and sulfide; and an amount of a pentahalophenyl ester having the formula

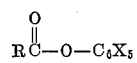

wherein

is the radical of an alkanoic acid having from one to four carbon atoms and X is chlorine or bromine sufficient to provide about 1.5 to about 10 percent halogen in the foam.

5. The foam according to claim 4 in which the pentahalophenyl ester compound is pentabromophenyl acetate.

6. A foam according to claim 4 in which the antimony compound is Sb₂O₃.

References Cited by the Examiner

UNITED STATES PATENTS 3,164,558   1/1965   Eichhorn _____ 260—2.5

LEON J. BERCOVITZ, *Primary Examiner.*

DONALD E. CZAJA, *Examiner.*